(12) United States Patent
Katou

(10) Patent No.: US 8,096,174 B2
(45) Date of Patent: Jan. 17, 2012

(54) VEHICLE LOAD WEIGHT DETECTING APPARATUS

(75) Inventor: Michiya Katou, Ichinomiya (JP)

(73) Assignee: Pacific Industrial Co., Ltd, Gifu-ken (JP)

( * ) Notice: Subject to any disclaimer, the term of this patent is extended or adjusted under 35 U.S.C. 154(b) by 337 days.

(21) Appl. No.: 12/473,027

(22) Filed: May 27, 2009

(65) Prior Publication Data

US 2010/0180677 A1    Jul. 22, 2010

(30) Foreign Application Priority Data

Jan. 21, 2009    (JP) .................... 2009-011387

(51) Int. Cl.
*G01F 1/37* (2006.01)
(52) U.S. Cl. .................................... 73/146.3
(58) Field of Classification Search ......... 73/146–146.8; 701/78, 36, 29; 340/442–447
See application file for complete search history.

(56) References Cited

U.S. PATENT DOCUMENTS 6,664,890 B2    12/2003    Yamagiwa et al.
7,693,626 B2 *  4/2010    Breed et al. ................ 701/29

FOREIGN PATENT DOCUMENTS

| JP | 10-297228 | 11/1998 |
|----|-----------|---------|
| JP | 3578311 | 9/1999 |
| JP | 2002-225519 | 8/2002 |
| JP | 2004-317443 | 11/2004 |
| JP | 2005-140503 | 6/2005 |

OTHER PUBLICATIONS

Office Action for Japanese Patent Application No. 2009-011387 dated Apr. 26, 2011.

* cited by examiner

*Primary Examiner* — Jewel V Thompson
(74) *Attorney, Agent, or Firm* — Pearl Cohen Zedek Latzer, LLP

(57) ABSTRACT

A vehicle includes an ABS, which controls braking force on wheels, and a tire condition monitoring apparatus, which detects the internal air pressure of tires. The dynamic rolling radius of the tires is computed based on signals from rotation sensor units of the ABS. The weight of a load carried by the vehicle is computed based on the dynamic rolling radius of the tires and the internal air pressure of the tires detected by the tire condition monitoring apparatus. When computing the load weight, a load weight determination map, which previously sets the relationship among the internal air pressure of the tires, the dynamic rolling radius of the tires, and the weight of the load carried by the vehicle, is used.

8 Claims, 6 Drawing Sheets

VEHICLE LOAD WEIGHT DETECTING APPARATUS

CROSS-REFERENCE TO RELATED APPLICATIONS

This application claims priority from Japanese application 2009-011387, filed on Jan. 21, 2009 incorporated by reference herein in its entirety.

FIELD OF THE INVENTION

BACKGROUND OF THE INVENTION

Japanese Patent No. 3578311 and Japanese Laid-Open Patent Publication No. 2005-140503 each disclose a vehicle weight detecting apparatus that detects the total weight of a vehicle or the weight of a load carried by the vehicle.

According to the weight detecting apparatus of Japanese Patent No. 3578311, an air pressure sensor for detecting the internal air pressure of a tire, a temperature sensor for detecting the internal temperature of the tire, and a transmitter, which wirelessly transmits signals representing the detected internal air pressure and internal temperature, are provided on each of vehicle wheels. A receiver, which receives signals from the transmitters, and a measuring apparatus, which computes the weight of the load carried by the vehicle based on the signals received by the receiver, are provided on the vehicle body. The measuring apparatus previously stores a table data, which sets the relationship between the internal air pressure of the tire and load applied to the tire. The measuring apparatus obtains the internal air pressure and the internal temperature of each tire from the signals received by the receiver, and corrects the value of the detected internal air pressure based on the internal temperature to obtain a corrected air pressure. Then, the measuring apparatus computes the total weight of the vehicle and the weight of the load carried by the vehicle based on the corrected air pressure using the table data.

According to the weight detecting apparatus of Japanese Laid-Open Patent Publication No. 2005-140503, a load sensor is provided between the rim of each vehicle wheel and the tire mounted on the rim. The load sensors each generate a voltage of a level corresponding to the load (tire load) applied to the tire from the rim. Also, a transmitter unit is mounted on each wheel. Each transmitter unit includes an air pressure sensor, which detects the internal air pressure of the tire, and a temperature sensor, which detects the internal temperature of the tire. Each load sensor is connected to the associated transmitter unit. Each transmitter unit wirelessly transmits signals representing the internal air pressure and the internal temperature detected by the air pressure sensor and the temperature sensor, and wirelessly transmits signals representing a value of voltage generated by the associated load sensor. A receiver unit is provided on the vehicle body. The receiver unit receives signals from the transmitters and computes the weight of the load carried by the vehicle based on the received signals. The receiver unit previously stores a map data, which sets the relationship between the output voltage value of the load sensor and the tire load for different internal air pressures of the tire. The receiver unit obtains the internal air pressure and the internal temperature of each tire from the received signals, and computes corrected air pressure by correcting the value of the internal air pressure based on the internal temperature. The receiver unit also obtains the output voltage value of each load sensor from the received signals, and computes the tire load using the map data based on the output voltage value and the corrected air pressure. Then, the receiver unit computes the total weight of the vehicle based on the tire load.

In the apparatus of Japanese Patent No. 3578311, the total weight of the vehicle and the weight of the load carried by the vehicle are computed using the table data, which sets the relationship between the internal air pressure of each tire and the load applied to each tire, based on the detected internal air pressure of the tire. That is, in the apparatus of Japanese Patent No. 3578311, based on the assumption that the internal air pressure of the tire changes in accordance with changes in the load applied to the tire, the total weight of the vehicle and the weight of the load carried by the vehicle are computed based on the internal air pressure of the tire. However, since the internal air pressure of the tires changes only slightly with respect to changes in the load applied to the tires, it is realistically difficult to accurately compute the total weight of the vehicle and the weight of the load carried by the vehicle from the relationship between the internal air pressure of the tire and the load applied to the tire. Thus, the apparatus of Japanese Patent No. 3578311 is not practical.

In the apparatus of Japanese Laid-Open Patent Publication No. 2005-140503, it is necessary to provide load sensors to detect the tire load. Thus, the configuration of the apparatus is complicated and the costs are increased. In addition, in the case in which the load sensor is provided between the rim of each wheel and the associated tire, air is more likely to leak from between the rim and the tire. Moreover, the operation for mounting the tires on the wheels becomes very cumbersome. Furthermore, in particular, when the vehicle is travelling, since sudden and great dynamic load is applied to the load sensors, it is not preferable to use the load sensors under such harsh conditions in the aspect of durability.

SUMMARY OF THE INVENTION

Accordingly, it is an objective of the present invention to provide a vehicle load weight detecting apparatus that accurately detects the weight of a load carried by the vehicle with a simplified structure and less costs.

To achieve the foregoing objective and in accordance with one aspect of the present invention, a vehicle load weight detecting apparatus including a tire condition monitoring apparatus, an anti-lock braking system, and a load weight computing section is provided. The tire condition monitoring apparatus detects the internal air pressure of tires mounted on wheels of a vehicle. The anti-lock braking system controls braking of the wheels, and includes a rotation detecting device, which generates a rotational signal having a frequency proportional to the rotational speed of the wheels. The load weight computing section computes the dynamic rolling radius of the tires based on the rotational signal, and computes the weight of a load carried by the vehicle based on the dynamic rolling radius and the internal air pressure of the tires detected by the tire condition monitoring apparatus.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to the drawings.

Figure 1:
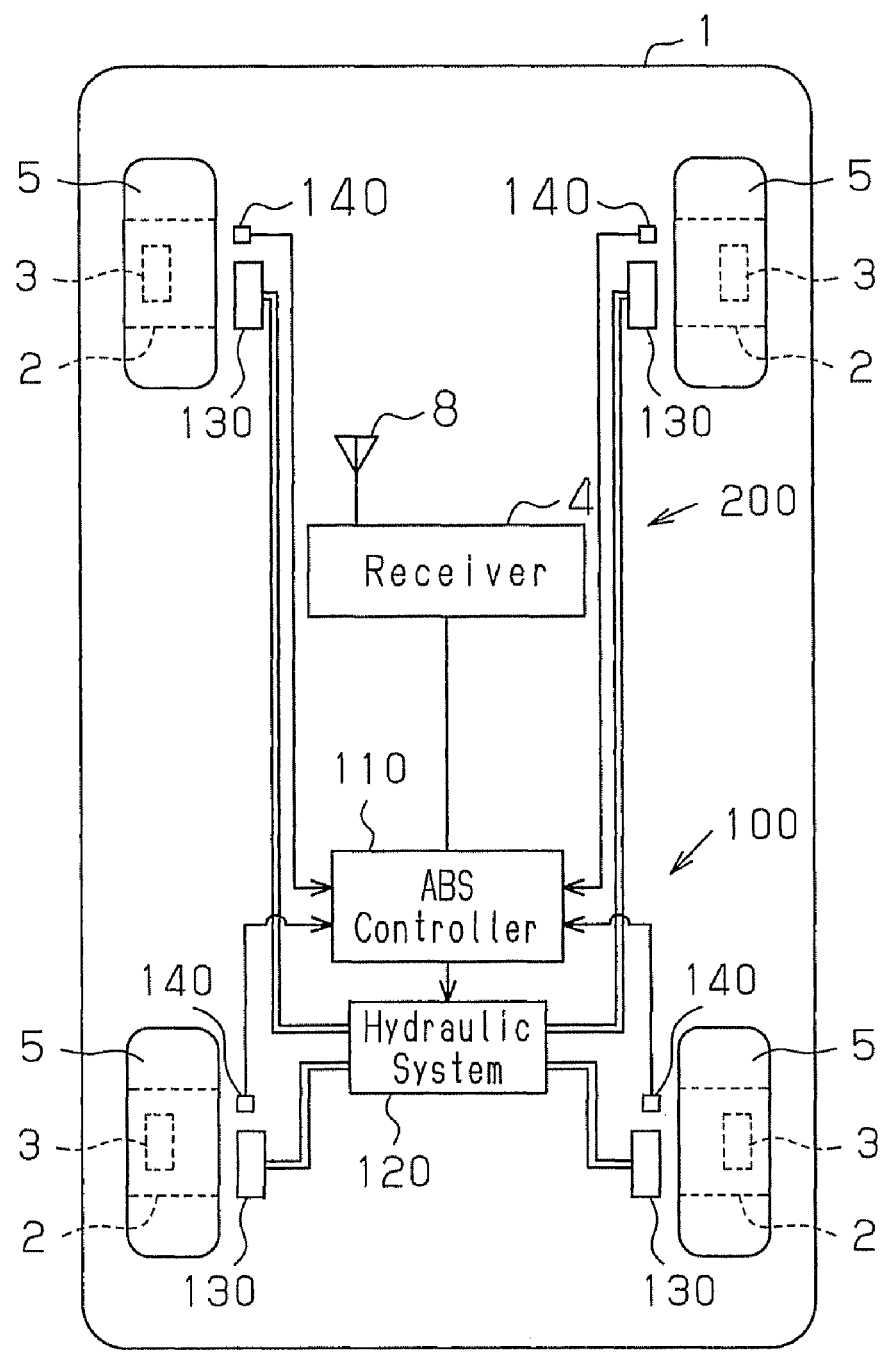
FIG. 1 is a schematic diagram illustrating a vehicle on which a vehicle load weight detecting apparatus according to one embodiment of the present invention is mounted.

As shown in FIG. 1, a vehicle 1 is provided with an ABS (anti-lock braking system) 100 and a tire condition monitoring apparatus 200.

First, the ABS 100 will be explained. The ABS 100 includes an ABS controller 110, a hydraulic system 120, brake units 130 corresponding to four wheels 2 of the vehicle 1, and rotation sensor units 140 corresponding to the four wheels 2. Each brake unit 130 brakes the corresponding wheel 2 by hydraulic oil supplied from the hydraulic system 120. The ABS controller 110 is configured by a microcomputer including a CPU, a ROM, and a RAM, and computes the rotational speed of each wheel 2 based on signals from the associated rotation sensor unit 140. Based on the rotational speed and the radius of the tire 5 mounted on each wheel 2, the ABS controller 110 computes the moving speed of the wheels 2 with respect to the road surface. The radius of the tires 5 is previously stored in the ROM of the ABS controller 110 as a reference value. When the brake pedal (not shown) of the vehicle is depressed, the ABS controller 110 also computes the slip ratio of each tire 5, and controls each brake unit 130 by the hydraulic system 120 such that the slip ratio does not exceed a predetermined permissible value, thereby adjusting the braking force on each wheel 2. The slip ratio S is computed by, for example, the following equation.

$$S=(V-Vr)/V$$

In the above equation, V is the vehicle speed, and Vr is the moving speed of the wheel 2. The vehicle speed V is computed as, for example, the mean of the moving speed Vr of the four wheels 2. For example, if one of the wheels 2 is locked by excessive braking force, the moving speed Vr of the wheel 2 is calculated as zero, and the slip ratio S is 100%. Thus, the braking force on the wheel 2 is reduced such that the slip ratio is reduced to less than or equal to the permissible value.

Figure 2A:
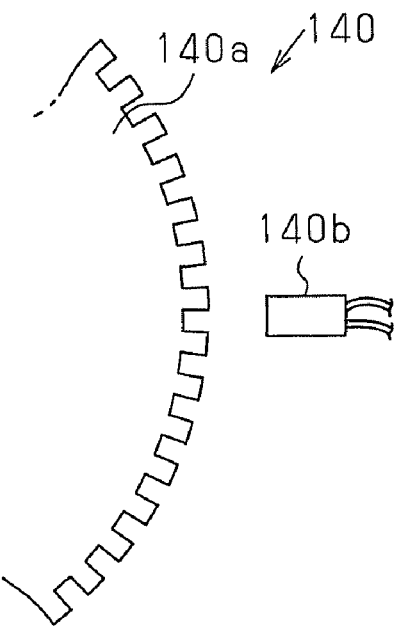
FIG. 2A is a schematic diagram illustrating the rotation sensor unit of FIG. 1.
Figure 2B:
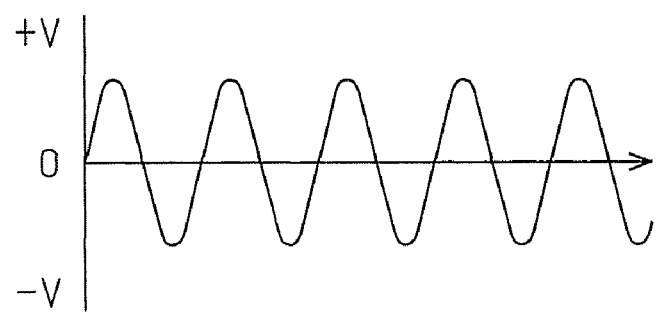
FIG. 2B is a graph showing alternating current generated by the pick up coil of the rotation sensor unit.

As shown in FIG. 2A, each rotation sensor unit 140, which serves as a rotation detecting device, includes a sensor rotor 140a, which rotates integrally with the associated wheel 2, and a pick up coil 140b, which is arranged to face the outer circumferential surface of the sensor rotor 140a. Teeth are arranged at equal angular intervals on the outer circumferential surface of each sensor rotor 140a. When each sensor rotor 140a rotates with the associated wheel 2, the pick up coil 140b generates an alternating current signal (rotational signal) having a frequency proportional to the rotational speed of the sensor rotor 140a, that is, the rotational speed of the wheel 2 as shown in FIG. 2B. The ABS controller 110 shapes the alternating current signal from each pick up coil 140b and generates a pulse signal string as shown in FIG. 2B. Then, the ABS controller 110 computes the rotational speed of each wheel 2 based on the number of the pulse signals per unit time.

The tire condition monitoring apparatus 200 will now be described. As shown in FIG. 1, the tire condition monitoring apparatus 200 includes four transmitters 3 each mounted on one of the wheels 2, and a receiver 4 mounted on the body of the vehicle 1. Each transmitter 3 is secured to the wheel 2 on which one of the tires 5 is mounted so as to be arranged inside the tire 5. Each transmitter 3 measures the condition (for example, the internal air pressure and the internal temperature) of the corresponding tire 5, and transmits signals including data representing the tire condition obtained by the measurement, that is, the tire condition detection signals on radio wave.

The receiver 4 is arranged at a predetermined position on the vehicle body, and is operated by, for example, power from the battery (not shown) of the vehicle 1. The receiver 4 includes at least one reception antenna 8. The receiver 4 receives the signals transmitted from the transmitters 3 through the reception antenna 8 and processes the reception signals.

Figure 3:
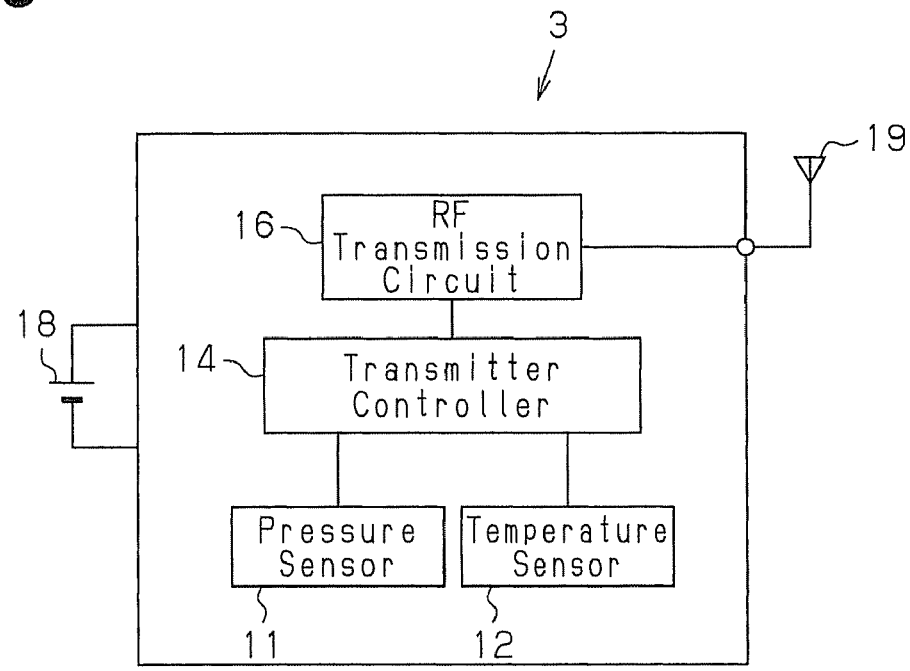
FIG. 3 is a block diagram showing a circuit configuration of the transmitter of FIG. 1.

As shown in FIG. 3, each transmitter 3 includes a pressure sensor 11, a temperature sensor 12, a transmitter controller 14, and an RF transmission circuit 16. The sensors 11, 12, the transmitter controller 14, and the RF transmission circuit 16 are driven by power supplied from a battery 18 embedded in the transmitter 3.

The pressure sensor 11 measures the internal air pressure of the corresponding tire 5, and outputs the air pressure data obtained by the measurement to the transmitter controller 14. The temperature sensor 12 measures the internal temperature of the corresponding tire 5, and outputs the temperature data obtained by the measurement to the transmitter controller 14. The transmitter controller 14 is configured by a microcomputer including a CPU, a RAM, and a ROM. An ID code, which is unique identification information, is registered in the RAM. The ID code is information used to identify each transmitter 3 at the receiver 4. The transmitter controller 14 outputs data including the air pressure data, the temperature data, and the ID code to the RF transmission circuit 16. The RF transmission circuit 16 generates a modulated signal by modulating the data from the transmitter controller 14, and wirelessly transmits the modulated signal from a transmission antenna 19.

Figure 4:
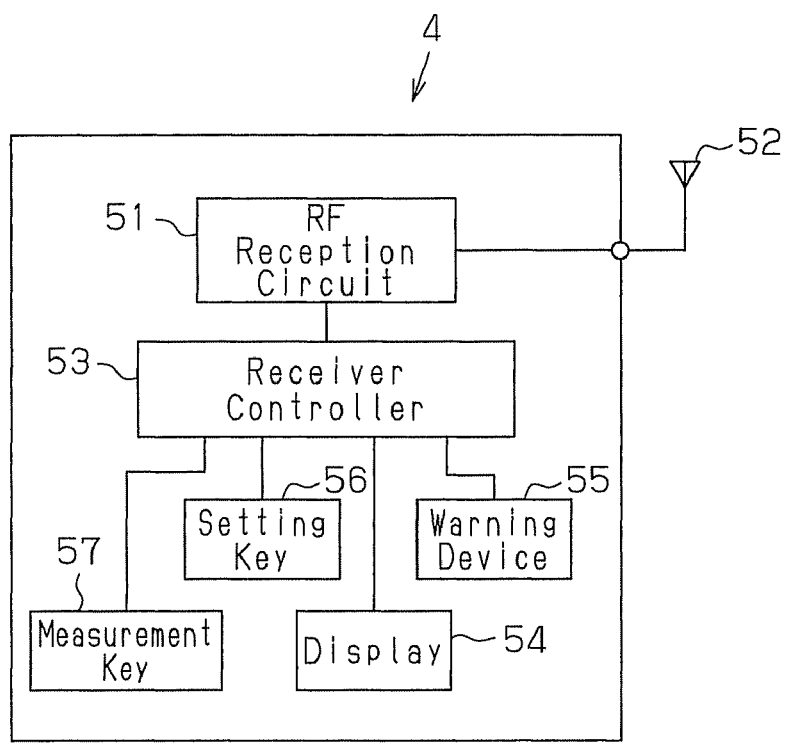
FIG. 4 is a block diagram showing a circuit configuration of the receiver of FIG. 1.

As shown in FIG. 4, the receiver 4 includes an RF reception circuit 51 and a receiver controller 53. The RF reception circuit 51 receives the transmission signals from the transmitters 3 via an RF reception antenna 52 and demodulates the signals. The RF reception circuit 51 transmits the data obtained by demodulating the reception signals to the receiver controller 53. The receiver controller 53 is configured by a microcomputer including a CPU, a ROM, and a RAM. Based on the data from the RF reception circuit 51, the receiver controller 53 obtains the internal air pressure and the internal temperature of the tire 5 corresponding to the transmitter 3 from which the signal is transmitted.

The receiver controller 53 also displays information about the internal air pressure and the internal temperature on a display 54. The display 54 is arranged in the view of an occupant of the vehicle 1 such as in the passenger compartment. The receiver controller 53 further informs the occupant of abnormality in the internal air pressure and the internal temperature by a warning device (alarm) 55. For example, a device that alerts the occupant of abnormality by sound, or a device that alerts the occupant of abnormality by light is applied as the warning device 55. Abnormality in the internal air pressure and the internal temperature of the tire 5 may be displayed on the display 54, which serves as the alarm.

The receiver 4 further includes various types of input keys including a setting key 56 and a measurement key 57. The functions of the setting key 56 and the measurement key 57 will be described below. The receiver controller 53 is also connected to the ABS controller 110 shown in FIG. 1 to be able to intercommunicate.

The present inventor found that the internal air pressure of each tire 5 hardly changes in accordance with change in the weight of the load carried by the vehicle 1, but the dynamic rolling radius of each tire 5 changes almost in proportion to change in the weight of the load carried by the vehicle 1 and changes almost in proportion to change in the internal air pressure of the tire 5. In the preferred embodiment, therefore, the dynamic rolling radius and the internal air pressure of each tire 5 are detected using the ABS 100 and the tire condition monitoring apparatus 200. The weight of the load carried by the vehicle 1 is detected based on the dynamic rolling radius and the internal air pressure. In the preferred embodiment, the ABS 100 and the tire condition monitoring apparatus 200 configure a vehicle load weight detecting apparatus, and the ABS controller 110 and the receiver controller 53 configure a load weight computing section.

Procedure for detecting the weight of the load carried by the vehicle 1 using the ABS 100 and the tire condition monitoring apparatus 200 will now be described with reference to FIGS. 5 to 8.

Figure 5:
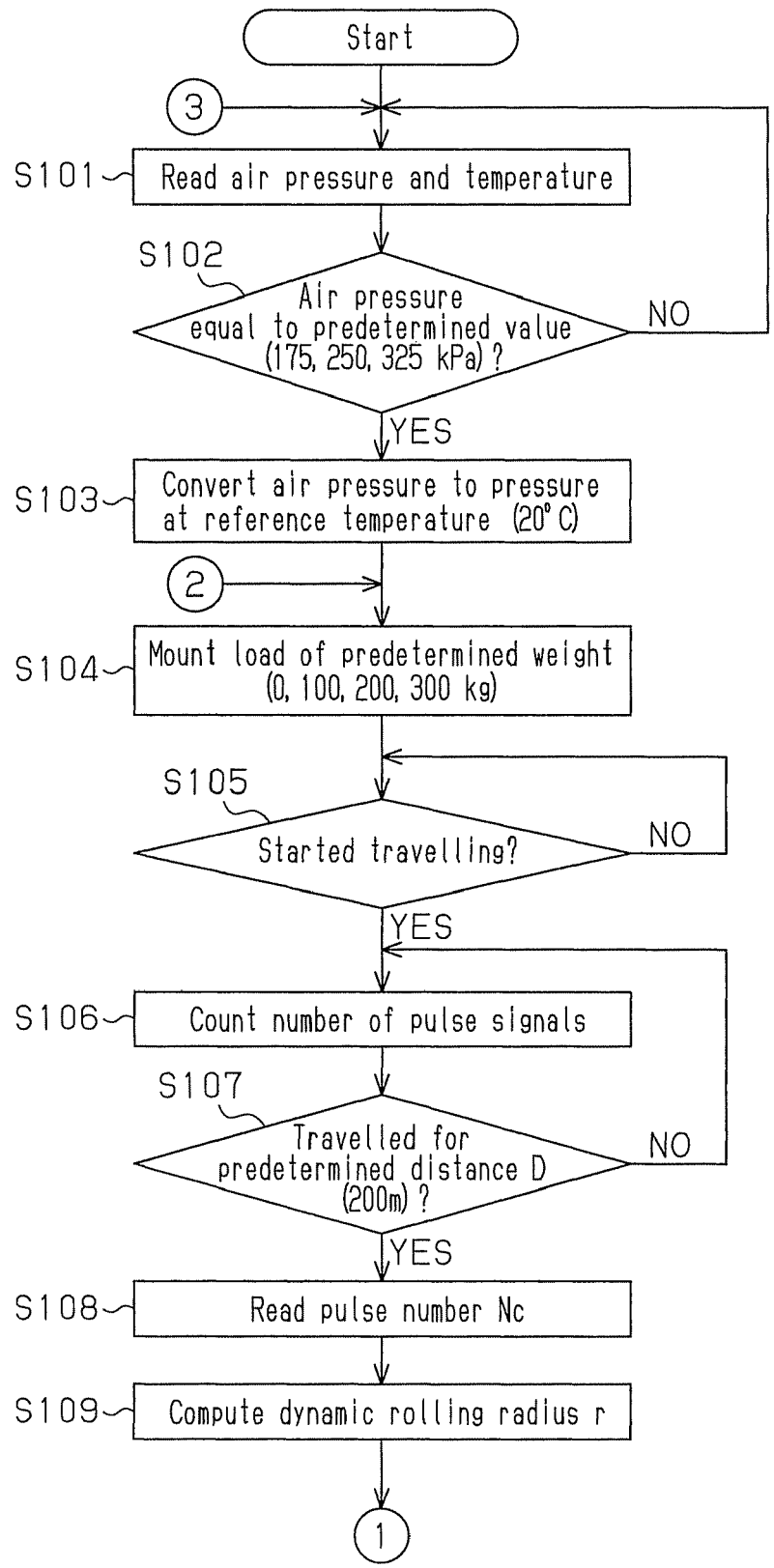
FIG. 5 is a flowchart showing a procedure for preparing a load weight determination map.
Figure 6:
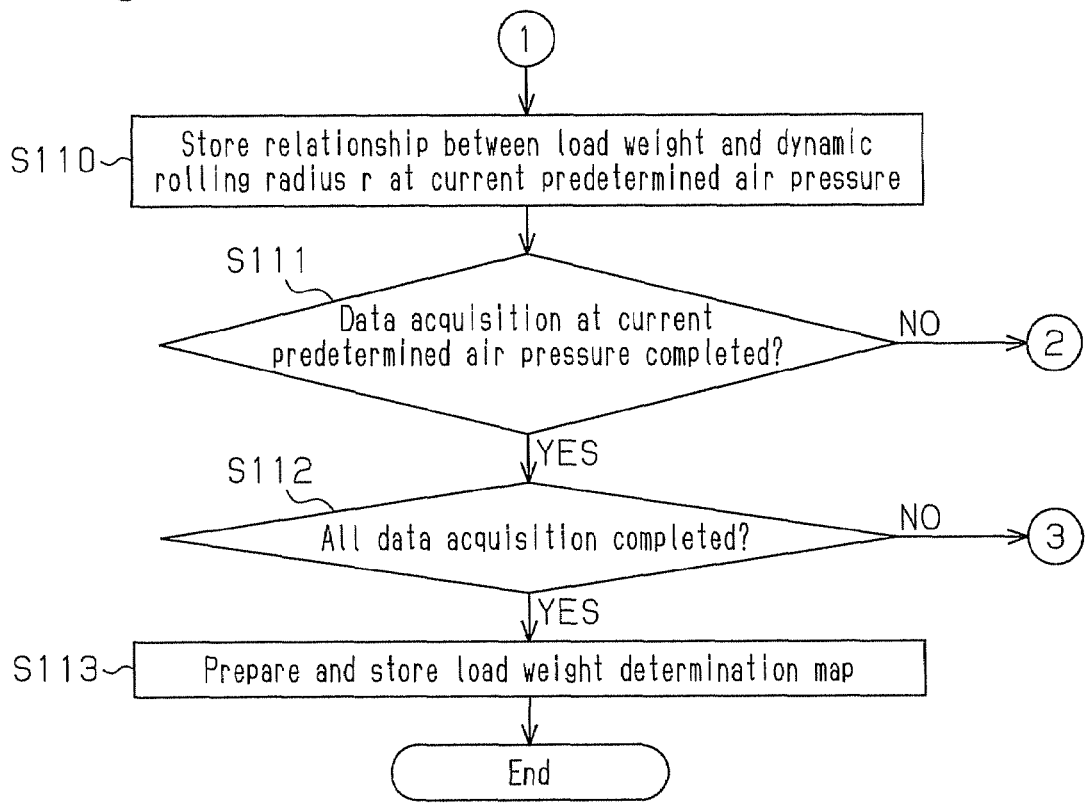
FIG. 6 is a flowchart showing the procedure for preparing the load weight determination map.

FIGS. 5 and 6 are flowcharts showing the procedure for preparing a load weight determination map (refer to FIG. 7) used when detecting the weight of the load. The procedure shown in the flowcharts is started when the setting key 56 provided on the receiver 4 is manipulated.

As shown in FIG. 5, first, the receiver controller 53 reads the internal air pressure and the internal temperature of the tires 5 based on the reception signals from the transmitters 3 in step S101. Next, in step S102, the receiver controller 53 determines whether the air pressure reading is equal to a predetermined value (predetermined air pressure). In the preferred embodiment, the predetermined value is, for example, any of 175 kPa, 250 kPa, and 325 kPa. The predetermined value 250 kPa is a reference air pressure of the tires 5, and 175 kPa is the air pressure that is higher than the reference air pressure by 30%, 325 kPa is the air pressure that is lower than the reference air pressure by 30%. An operator adjusts the internal air pressure of each tire 5 such that the internal air pressure of the tire 5 becomes equal to the predetermined value. In this embodiment, the internal air pressure of each tire 5 is assumed to be adjusted to 175 kPa.

When the internal air pressure of each tire 5 is determined to be equal to the predetermined value, in step S103, the receiver controller 53 converts each internal air pressure P1 (gage pressure) that has been read to a pressure Pk (gage pressure) at the reference temperature T0 (for example 20° C.), that is, to the reference air pressure Pk in accordance with the following equation based on the Boyle-Charles law. In the following equation, P0 is the atmospheric pressure, and T1 is each internal temperature that has been read in step S101.

$$(P1+P0)/(T1+273)=(Pk+P0)/(T0+273)$$

$$Pk=(P1+P0)\times(T0+273)/(T1+273)-P0$$

After computing the reference air pressure Pk of each tire 5, the operator mounts a load of a predetermined weight on the vehicle 1 in step S104. In the preferred embodiment, the predetermined weight (load weight) is 0 kg, 100 kg, 200 kg, or 300 kg. In this embodiment, it is assumed that a load of 0 kg, or no load, is mounted on the vehicle 1.

In the subsequent step S105, the ABS controller 110 determines whether the vehicle 1 has started travelling. The ABS controller 110 determines that the vehicle 1 has started travelling when, for example, input of the voltage signal from the rotation sensor units 140 (refer to FIG. 2B) is started.

Figure 2C:
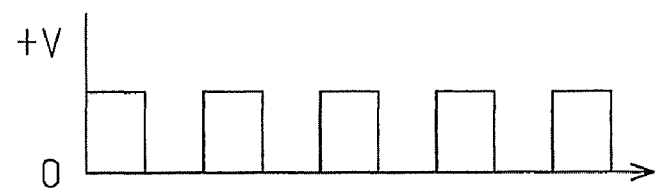
FIG. 2C is a graph showing a pulse signal string generated from the alternating current of FIG. 2B.

When it is determined that the vehicle 1 has started travelling, in step S106, the ABS controller 110 counts the number of pulse signals corresponding to each tire 5 (refer to FIG. 2C) based on the voltage signals from each rotation sensor unit 140. The ABS controller 110 determines whether the vehicle 1 has traveled a predetermined distance D in step S107, and continues to count the number of the pulse signals until the vehicle 1 travels the predetermined distance D (for example, 200 m). The vehicle 1 preferably travels on a flat road surface at low speed (for example, 2 km/h).

The ABS controller 110 determines that the vehicle 1 has traveled the predetermined distance D when, for example, a driver has actually had the vehicle 1 to travel the predetermined distance D and stopped the vehicle 1 so that input of the voltage signal from each rotation sensor unit 140 is stopped. The predetermined distance D is not the distance on the trip meter provided on the vehicle 1, but is the actual distance. Alternatively, if a car navigation system including a GPS is mounted on the vehicle 1, the ABS controller 110 may determine whether the vehicle 1 has traveled the predetermined distance D based on the moving distance of the vehicle 1 detected by the GPS.

If it is determined that the vehicle 1 has traveled the predetermined distance D, the ABS controller 110 transmits the number of the pulse signals corresponding to each tire 5 (hereinafter, referred to as a pulse number Nc) to the receiver controller 53. Therefore, in step S108, the receiver controller 53 reads the pulse number Nc corresponding to each tire 5. The pulse number Nc corresponds to the rotation amount of each wheel 2 (that is, the rotation amount of each tire 5) while the vehicle 1 travels the predetermined distance D.

In the subsequent step S109, the receiver controller 53 computes the dynamic rolling radius r of each tire 5 based on the predetermined distance D and the pulse number Nc using the following equation. In the following equation, N is the number of teeth of the sensor rotor 140a in each rotation sensor unit 140, and Nc/N is the number of rotation of each sensor rotor 140a while the vehicle 1 travels the predetermined distance D (in other words, the number of rotation of each tire 5).

$$(Nc/N)\times 2\pi r=D$$

$$r=(D\times N)/(2\pi\times Nc)$$

In the subsequent step S110 in FIG. 6, the receiver controller 53 stores the relationship between the load weight at the current predetermined air pressure and the dynamic rolling radius r of each tire 5 in the RAM. For example, when the current predetermined air pressure is 175 kPa and the weight of the load (load weight) is 0 kg, the value of 0 kg and the value of the dynamic rolling radius r of each tire 5 are stored in association with the predetermined air pressure of 175 kPa (more accurately, a value in which 175 kPa is converted to the reference air pressure Pk).

Next, in step S111, the receiver controller 53 determines whether data acquisition at the current predetermined air pressure has been completed. That is, for example, when the current predetermined air pressure is 175 kPa, it is determined whether the data of the dynamic rolling radius r corresponding to all the load weight including 0 kg, 100 kg, 200 kg, and 300 kg has been acquired for the predetermined air pressure of 175 kPa.

If the data acquisition at the current predetermined air pressure has not been completed, the process returns to step S104 of FIG. 5 and a load of different weight is mounted on the vehicle 1. Then, processes of steps S105 to S111 are repeated. In this manner, the processes of steps S104 to S111 are repeated until the data of the dynamic rolling radius r corresponding to all the load weight including 0 kg, 100 kg, 200 kg, and 300 kg for the current predetermined air pressure is acquired.

In step S111, if it is determined that the data acquisition at the current predetermined air pressure has been completed, the receiver controller 53 determines whether all the data acquisition has been completed in step S112 of FIG. 6. That is, it is determined whether data of the dynamic rolling radius r corresponding to all the load weight including 0 kg, 100 kg, 200 kg, and 300 kg for all the predetermined air pressures including 175 kPa, 250 kPa, and 325 kPa have been acquired.

If not all the data acquisition has been completed, the process returns to step S101 of FIG. 5 and the internal air pressure of the tires 5 is adjusted to the different predetermined air pressure. Then, the above mentioned process is performed for the different predetermined air pressure.

Figure 7:
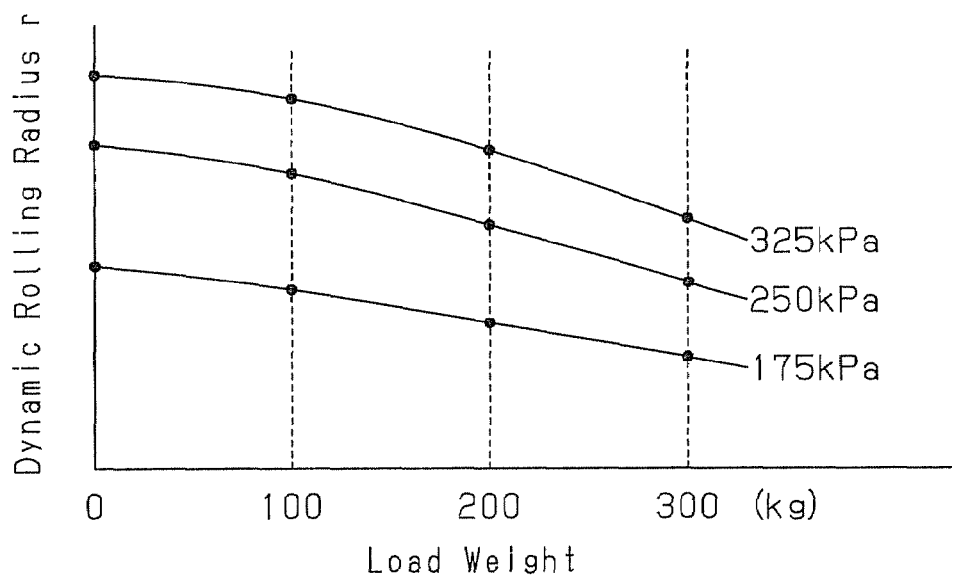
FIG. 7 is a graph showing the load weight determination map.

When all the data acquisition has been completed, the receiver controller 53 prepares the load weight determination map as shown in FIG. 7 based on the obtained data stored in the RAM, and stores the map in the RAM in step S113 of FIG. 6. Then, the receiver controller 53 ends the routine. As shown in FIG. 7, load weight determination data, which is the load weight determination map in this embodiment, sets the relationship between the load weight and the dynamic rolling radius r for each of the predetermined air pressure including 175 kPa, 250 kPa, and 325 kPa (more accurately, a value in which the predetermined air pressure is converted to the reference air pressure Pk). The load weight determination map may be prepared as maps each corresponding to one of the tires 5, or may be prepared as a single map representing the mean of the dynamic rolling radius r of all the tires 5.

Figure 8:
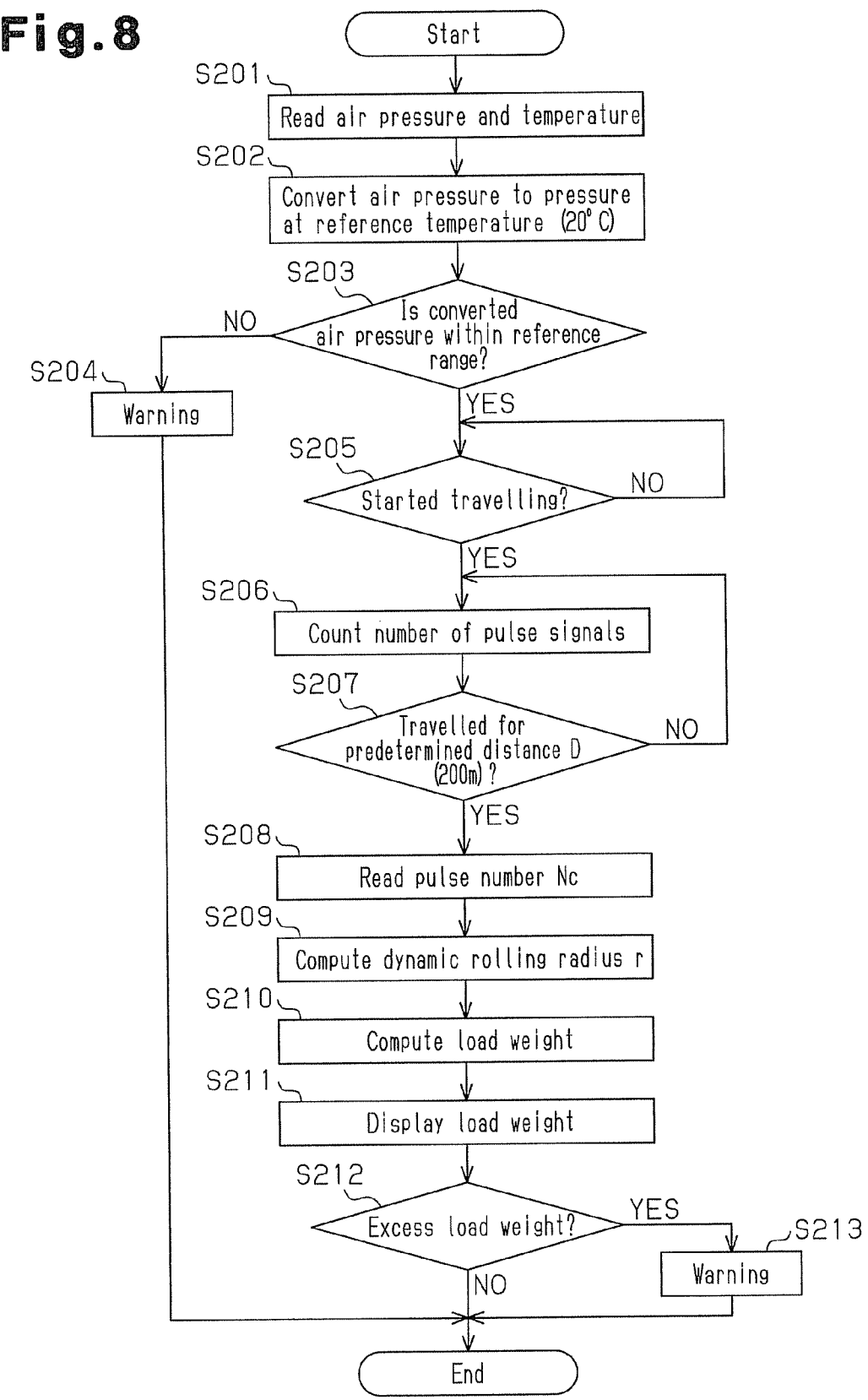
FIG. 8 is a flowchart showing a procedure for detecting load weight.

FIG. 8 is a flowchart showing the procedure for detecting the weight of the load carried by the vehicle 1 using the load weight determination map prepared as described above. The procedure shown in the flowchart is started when the measurement key 57 provided on the receiver 4 is manipulated.

First, in step S201, the receiver controller 53 reads the internal air pressure and the internal temperature of each tire 5 based on reception signals from the transmitters 3. Then, in step S202, the receiver controller 53 converts the internal air pressure that has been read to the pressure at the reference temperature (for example, 20° C.), that is, to the reference air pressure in the same manner as the process in step S103 of FIG. 5.

In the subsequent step S203, the receiver controller 53 determines whether the converted air pressure, that is, the reference air pressure is within a reference range. The reference range is, for example, the range of the predetermined air pressure described in the step S102 of FIG. 5, that is, the range from 175 kPa to 325 kPa. If the converted air pressure is out of the reference range, the receiver controller 53 warns the operator through at least one of the display 54 and the warning device 55 in step S204, and ends the routine. In this case, after adjusting the internal air pressure of each tire 5, the operator manipulates the measurement key 57 again and restarts the procedure of FIG. 8.

If the converted air pressure is within the reference range, the ABS controller 110 determines whether the vehicle 1 has started travelling in step S205. Since the processes of steps S205 to S209 are the same as the processes of steps S105 to S109 of FIG. 5, the explanation is omitted.

In step S209, the dynamic rolling radius r of each tire 5 is computed. After that, in step S210, the receiver controller 53 computes the weight of the load carried by the vehicle 1 through, for example, interpolation using the load weight determination map of FIG. 7. For example, the weight of the load carried by the vehicle 1 is computed based on the mean of the air pressure of all the tires 5 after conversion that is computed in step S202, and the mean of the dynamic rolling radius r of all the tires 5 computed in step S209 using a single load weight determination map representing the mean of the dynamic rolling radius r all the tires 5. If the mean of the air pressure of all the tires 5 after conversion that is computed in step S202 differs from the air pressure value corresponding to three characteristic lines on the load weight determination map of FIG. 7, the relationship between the load weight and the dynamic rolling radius r corresponding to the different air pressure value is computed by interpolation using the three characteristic lines on the map.

When load weight determination maps each corresponding to one of the tires 5 are prepared, unevenness of the load with respect to the vehicle 1 can be determined based on the air pressure of each tire 5 after conversion that is computed in step S202, and the dynamic rolling radius r of each tire 5 computed in step S209 using the load weight determination map corresponding to each tire 5.

In the subsequent step S211, the receiver controller 53 displays the computed value of the load weight on the display 54. In step S212, the receiver controller 53 determines whether the computed load weight exceeds a reference value specified for the vehicle 1. If the load weight exceeds the reference value, the receiver controller 53 warns the operator through at least one of the display 54 and the warning device 55 in step S213, and ends the routine. If the load weight does not exceed the reference value, the receiver controller 53 ends the routine immediately.

The preferred embodiment has the following advantages.

(1) According to the preferred embodiment, in the vehicle 1 including the ABS 100, which controls the braking force on the wheels 2, and the tire condition monitoring apparatus 200, which detects the internal air pressure of the tires 5, the dynamic rolling radius and the internal air pressure of the tires 5 are detected using the ABS 100 and the tire condition monitoring apparatus 200. The weight of the load carried by the vehicle 1 is computed based on the dynamic rolling radius and the internal air pressure. Thus, since it is not necessary to additionally provide components such as the load sensor for detecting the weight of the load carried by the vehicle 1, the configuration is simplified and the costs are reduced while accurately detecting the load weight.

(2) Based on the alternating current signal (rotational signal) obtained from the rotation sensor units 140, the number of the pulse signals Nc (rotation amount of the tires 5) while the vehicle 1 travels the predetermined distance D is computed. Based on the predetermined distance D and the number of the pulse signals Nc, the dynamic rolling radius of the tires 5 is computed. Thus, the dynamic rolling radius of the tires 5 is easily and accurately obtained.

(3) The receiver controller 53 previously stores the load weight determination map (load weight determination data), which sets the relationship among the internal air pressure of the tires 5, the dynamic rolling radius of the tires 5, and the weight of the load carried by the vehicle 1. Then, the receiver controller 53 computes the internal air pressure of the tires 5 and the dynamic rolling radius of the tires 5 for the vehicle 1 on which the load is mounted. Based on these, the weight of the load carried by the vehicle 1 is computed using the load weight determination map. By previously preparing the load weight determination map, the load weight is easily and accurately obtained.

(4) In the load weight determination map, the relationship between the dynamic rolling radius of the tires 5 and the weight of the load carried by the vehicle 1 is set corresponding to each of different internal air pressures. By using such a load weight determination map, the relationship between the dynamic rolling radius and the load weight with respect to the internal air pressure of the tires 5 is further accurately obtained, and the load weight is further accurately obtained.

(5) In the load weight determination map, the internal air pressure of the tires 5 is set as the pressure at the predetermined reference temperature. Then, based on the internal air pressure and the internal temperature of the tires 5 detected by the tire condition monitoring apparatus 200, the detected internal air pressure is converted to the pressure at the reference temperature, and the load weight is computed using the converted pressure. This eliminates the influence of the change in the internal air pressure due to the internal temperature of the tires 5, and the load weight is further accurately obtained.

The preferred embodiment may be modified as follows.

In the load weight determination map, instead of setting the relationship between the dynamic rolling radius of the tires 5 and the weight of the load carried by the vehicle 1 corresponding to each of the different internal air pressures, the relationship between the dynamic rolling radius of the tires 5 and the weight of the load carried by the vehicle 1 may be set for only a specific internal air pressure.

As the load weight determination data, a relational expression, which sets the relationship among the internal air pressure of the tires 5, the dynamic rolling radius of the tires 5, and the weight of the load carried by the vehicle 1, may be used instead of the load weight determination map as shown in FIG. 7.

The load weight determination data may be prepared by simulation.

The process for detecting the load weight may be performed by only the ABS controller 110 or only the receiver controller 53, or shared by the controllers 110, 53 as required. Alternatively, the process for detecting the load may be performed by an on-vehicle ECU provided separately from the controllers 110, 53.

Therefore, the present examples and embodiments are to be considered as illustrative and not restrictive and the invention is not to be limited to the details given herein, but may be modified within the scope and equivalence of the appended claims.

The invention claimed is:

1. A vehicle load weight detecting apparatus comprising:
a tire condition monitoring apparatus which detects the internal air pressure of tires mounted on wheels of a vehicle;
an anti-lock braking system, which controls braking of the wheels, the anti-lock braking system including a rotation detecting device, which generates a rotational signal having a frequency proportional to the rotational speed of the wheels; and
a load weight computing section, which computes the dynamic rolling radius of the tires based on the rotational signal* and computes the weight of a load carried by the vehicle based on the dynamic rolling radius and the internal air pressure of the tires detected by the tire condition monitoring apparatus.

2. The vehicle load weight detecting apparatus according to claim 1, wherein the load weight computing section computes the rotation amount of each tire while the vehicle travels a predetermined distance based on the rotational signal, and computes the dynamic rolling radius of the lire based on the predetermined distance and the rotation amount of the tire.

3. The vehicle load weight detecting apparatus according to claim 1, wherein the load weight computing section previously stores a load weight determination data, which sets the relationship among the internal air pressure of the tires, the dynamic rolling radius of the tires, and the weight of the load carried by the vehicle, and the load weight computing section computes the weight of the load carried by the vehicle using the load weight determination data based on the internal air pressure of the tires and the dynamic rolling radius of the tires of the vehicle on which the load is mounted.

4. The vehicle load weight detecting apparatus according to claim 3, wherein the load weight determination data sets the relationship between the dynamic rolling radius of the tires and the weight of the load carried by the vehicle corresponding to each of a plurality of different internal air pressures.

5. The vehicle load weight detecting apparatus according to claim 3, wherein the internal air pressure of the tires is set as the pressure at a predetermined reference temperature in the load weight determination data, wherein the tire condition monitoring apparatus is configured to detect both the internal air pressure of the tires and the internal temperature of the tires, and wherein based on the internal air pressure of the tires and the internal temperature of the tires detected by the tire condition monitoring apparatus, the load weight computing section converts the detected internal air pressure of the tires to the pressure at the reference temperature, and computes the weight of the load carried by the vehicle using the converted pressure.

6. The vehicle load weight detecting apparatus according to claim 1, wherein the rotation detecting device includes a sensor rotor, which rotates integrally with the wheel, and a pick up coil, which is arranged to face the sensor rotor, and a plurality of teeth are arranged at equal angular intervals on an outer circumferential surface of the sensor rotor.

7. A vehicle load weight detecting apparatus comprising:
a tire condition monitoring apparatus, which detects the internal air pressure of tires mounted on wheels of a vehicle;
an anti-lock braking system, which controls braking of the wheels, the anti-lock braking system including a rotation detecting device, which generates a rotational signal having a frequency proportional to the rotational speed of the wheels; and
a load weight computing section, which computes the dynamic rolling radius of the tires based on the rotational signal, and computes the weight of a load carried by the vehicle based on the dynamic rolling radius and the internal air pressure of the tires detected by the tire condition monitoring apparatus,
wherein the load weight computing section previously stores a load weight determination data, which sets the relationship among the internal air pressure of the tires, the dynamic rolling radius of the tires, and the weight of the load carried by the vehicle, and the load weight computing section" computes the weight of the load carried by the vehicle using the load weight determination data based on the internal air pressure of the tires and the dynamic rolling radius of the tires of the vehicle on which the load is mounted, and wherein the load weight determination data sets the relationship between the dynamic rolling radius of the tires and the weight of the load carried by the vehicle corresponding to a specific internal air pressure, the specific internal air pressure being set based on a reference air pressure of the tire.

8. The vehicle load weight detecting apparatus according to claim 7, wherein the specific internal air pressure is one of a plurality of different internal air pressures, wherein the load weight determination data sets the relationship between the dynamic rolling radius of the tires and the weight of the load carried by the vehicle corresponding to each of the plurality of different internal air pressures.

* * * * *